United States Patent
Ivan

(10) Patent No.: US 7,388,206 B2
(45) Date of Patent: Jun. 17, 2008

(54) PULSE SHAPE DISCRIMINATION METHOD AND APPARATUS FOR HIGH-SENSITIVITY RADIOISOTOPE IDENTIFICATION WITH AN INTEGRATED NEUTRON-GAMMA RADIATION DETECTOR

(75) Inventor: Adrian Ivan, Niskayuna, NY (US)

(73) Assignee: GE Homeland Protection, Inc., Newark, CA (US)

( * ) Notice: Subject to any disclaimer, the term of this patent is extended or adjusted under 35 U.S.C. 154(b) by 217 days.

(21) Appl. No.: 11/424,559

(22) Filed: Jun. 16, 2006

(65) Prior Publication Data

US 2007/0290136 A1 Dec. 20, 2007

(51) Int. Cl.
*G01T 1/20* (2006.01)
*G01T 1/00* (2006.01)

(52) U.S. Cl. ................... 250/363.01; 250/393

(58) Field of Classification Search ............. 250/393, 250/363.01
See application file for complete search history.

(56) References Cited

U.S. PATENT DOCUMENTS 6,953,937 B2  10/2005  Reber et al.

2006/0163486 A1*  7/2006  Laurence et al. ...... 250/363.04

* cited by examiner

*Primary Examiner*—David P. Porta
*Assistant Examiner*—Carolyn Igyarto
(74) *Attorney, Agent, or Firm*—William E. Powell, III; Curtis B. Brueske

(57) ABSTRACT

A method and apparatus for discriminating the types of radiation interacting with an integrated radiation detector having of a pulse-mode operating photosensor which is optically coupled to a gamma-ray scintillator sensor and a neutron scintillator sensor and uses an analog to digital converter (ADC) and a charge to digital converter (QDC) to determine scintillation decay times and classify radiation interactions by radiation type. The pulse processing provides for, among other things, faithful representation of the true energy spectrum of the gamma radiation field and allows for radioisotope identification by searching for the presence of characteristic energy lines in the gamma energy spectrum. The pulse shape discrimination method ensures that the high sensitivity and resolution of the isotope identification function is not affected during operation in mixed neutron-gamma fields.

21 Claims, 5 Drawing Sheets

Mixed α + γ spectrum

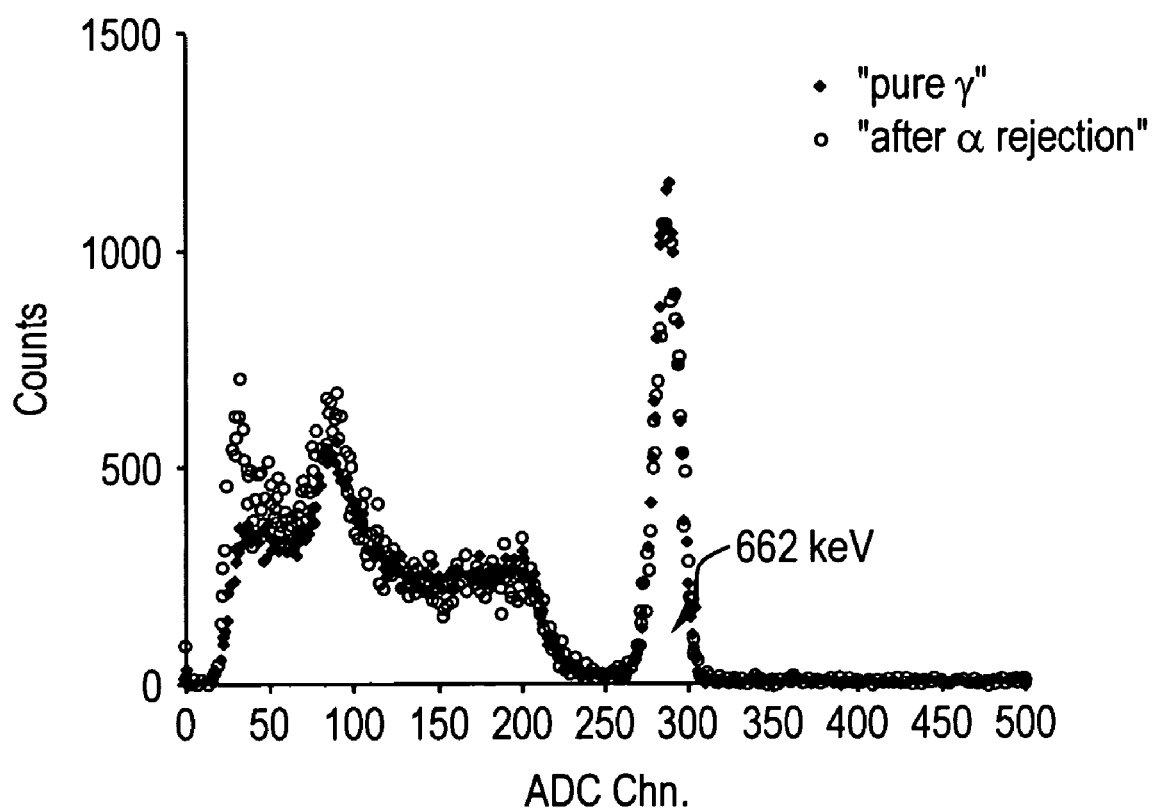

PULSE SHAPE DISCRIMINATION METHOD AND APPARATUS FOR HIGH-SENSITIVITY RADIOISOTOPE IDENTIFICATION WITH AN INTEGRATED NEUTRON-GAMMA RADIATION DETECTOR

STATEMENT REGARDING FEDERALLY SPONSORED RESEARCH

This invention was made with Government support under Contract No. N66001-05-D-6012 awarded by the Department of Homeland Security. The Government has certain rights in this invention.

BACKGROUND OF THE INVENTION

1. Field of the Invention

The teachings herein relate to a hand held detector of ionizing radiation and more particularly to a detector for discriminating a gamma component and a neutron component.

2. Description of the Related Art

Detection of radioactive materials, particularly those illicitly hidden in the stream of commerce, requires a variety of radiation detection equipment be available. In particular, Hand-Held RadioIsotope Identification Devices (HHRIID) are needed in the field to quickly determine the presence of special nuclear material (in simple terms, being defined as plutonium, uranium 233, uranium enriched in the isotope 233 or in the isotope 235). Preferably, HHRIID provide users with information regarding the radioisotopic composition of any radioactive material identified. Typical HHRIID devices are handheld and battery-powered and have limited features. These devices are consistently exposed to variable operating conditions and radiation backgrounds. Further, for most applications, the HHRIID must satisfy the specifications set forth in ANSI Standards N42.33 and N42.34. Since special nuclear materials can present a mixed neutron-gamma signature, effective isotopic analysis requires an HHRIID be capable of providing a high-resolution, high-sensitivity response to gamma rays without being affected by the presence and intensity of a neutron field. This poses a problem in HHRIID embodiments in which, for practical reasons of reducing size, weight and power consumption, a single photosensor detects the light emitted by both the gamma ray sensing element and the neutron sensing element. A method to discriminate between the scintillation light pulses emitted by the two radiation sensing elements is necessary.

For detectors without pulse shape discrimination, the energy spectrum of one type of radiation can be distorted by the presence of a strong field of radiation of a second type. For example, the gamma ray spectrum, which is very important for radionuclide identification in HHRIID applications, can include counts due to unrejected neutron response and thus reduce the sensitivity and specificity of the device.

Some techniques for radiation pulse shape discrimination addressed the problem by measuring and comparing features of the electrical signals emitted by the photosensor after light excitation: pulse amplitude, pulse rise time, pulse decay time, or total integrated charge. Some applications of the existing methods include, for example: 1) discrimination against gamma background in liquid or solid organic scintillators used as direct fast neutron detectors; 2) discrimination between long-range and short-range particles in gas proportional counters; 3) separation of radiations of different energies and/or depths of interaction in phoswich detectors (that is, a detector that includes a combination of scintillators with dissimilar pulse shape characteristics optically coupled to each other and one or more photomultiplier tubes); 4) rejection of spurious or defective pulses in direct conversion detectors (Si, HPGe), and other.

One attempt to address some of the challenges in detection is disclosed in U.S. Pat. No. 6,953,937, entitled "Method and Apparatus for the Detection of Neutrons and Gamma Rays," which issued on Oct. 11, 2005 to Reber et al. This patent teaches a pulse discrimination method for discriminating between pulses having a short decay period and a long decay period, may comprise: Detecting the pulse; integrating a rise portion of the pulse; integrating a decay portion of the pulse; and comparing the integrated rise portion of the pulse with the integrated decay portion of the pulse to distinguish between a pulse having a long decay period and a pulse having a short decay period. Unfortunately, the teachings of this patent do not provide for sensitive analyses, as a single detector is used, and calls for an "artificial line of separation" to distinguish radiation types. Further disadvantages of this design include poor sensitivity and energy resolution for gamma radiation as well as optical self-absorption and self-excitation in the scintillator material.

What is needed is a compact, integrated HHRIID design that provides for accurate discrimination between radiation types, thus enabling improved analyses of the various components of a mixed radiation field.

BRIEF SUMMARY OF THE INVENTION

Disclosed is a method for discriminating between radiation types of a mixed radiation field, the method including: selecting a radioisotope identification device (RIID) having a photomultiplier tube (PMT) optically coupled to a first sensor and a second sensor, the PMT also coupled to electronics including an analog-to-digital converter (ADC) and a charge-to-digital converter (QDC); using the first sensor and the second sensor, detecting interactions of radiation incident on the RIID in the mixed radiation field; using the ADC, determining a signal amplitude $V_0$ for each detected interaction and using the QDC, determining a signal charge Q for each detected interaction; and classifying each radiation interaction according to radiation type by evaluating the signal amplitude $V_0$ and the signal charge Q.

Also disclosed is a radioisotope identification device (RIID) for discriminating between radiation types in a mixed radiation field, the RIID having a photomultiplier tube (PMT) optically coupled to at least a first sensor and a second sensor, the PMT also coupled to electronics including an analog-to-digital converter (ADC) and a charge-to-digital converter (QDC), wherein the ADC provides for determining a signal amplitude $V_0$ associated with detected radiation interactions and the QDC provides for determining a signal charge Q associated with each detected radiation interaction; and machine readable instructions stored on machine readable media for classifying each radiation interaction according to radiation type by evaluating the signal amplitude $V_0$ and the signal charge Q.

Further disclosed is a method for discriminating between radiation types of a mixed radiation field, the method including: selecting a radioisotope identification device (RIID) having a photomultiplier tube (PMT) optically coupled to a first sensor and a second sensor, the PMT also coupled to electronics including an analog-to-digital converter (ADC) and a charge-to-digital converter (QDC);

using the first sensor and the second sensor, detecting interactions of radiation incident on the RIID in the mixed radiation field; using the ADC, determining a signal amplitude $V_O$ for each detected interaction and using the QDC, determining a signal charge Q for each detected interaction; and classifying each radiation interaction according to radiation type by evaluating the signal amplitude $V_O$ and the signal charge Q; wherein an integration time for at least one of the QDC and the ADC is selected for controlling pulse shape discrimination to account for a scintillation decay time associated with each type of radiation.

BRIEF DESCRIPTION OF THE DRAWINGS

FIG. 7 is a spectral display for HHRIID employing discrimination as taught herein.

DETAILED DESCRIPTION OF THE INVENTION

Figure 1:
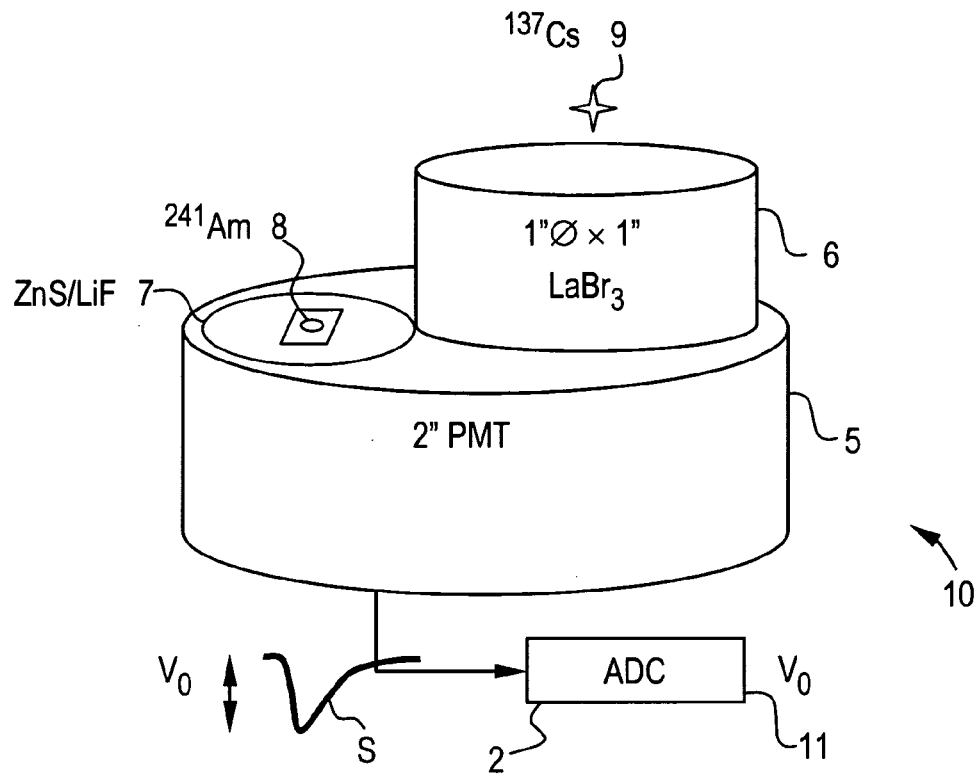
FIG. 1 depicts components of an HHRIID without pulse shape discrimination according to the teachings herein.

Referring now to FIG. 1, there are shown aspects of a Hand-Held Radioisotope Identification Device (HHRIID) 10 without pulse shape discrimination capability in a mixed radiation field, presented herein for reference. In the embodiment depicted, the mixed field HHRIID 10 provides for simultaneous detection of neutron radiation and gamma radiation, but without distinguishing between neutron and gamma radiation.

In typical embodiments, the mixed field HHRIID 10 includes a photosensor 5, a gamma sensor 6, a neutron sensor 7, an alpha emitting check source 8 and a gamma emitting check source 9. In the exemplary embodiment depicted, the photosensor 5 includes a photomultiplier tube (PMT); the gamma sensor 6 includes a $LaBr_3$ (lanthanum bromide) crystal; the neutron sensor 7 includes a ZnS/LiF (zinc sulfide and lithium fluoride) component; the alpha emitting check source 8 (also referred to as an "alpha source") includes an Americium-241 (Am-241) source; and, the gamma emitting check source 9 (also referred to as an "gamma source") includes a Cesium-137 (Cs-137) source.

Although in the embodiment presented herein the photosensor 5 includes a single photomultiplier tube (PMT), the photosensor 5 might include other photosensitive devices. For example, other embodiments of the photosensor 5 might include multiple PMT, a photodiode, an avalanche photodiode, and other similar components. In short, the photosensor 5 is designed to receive and interpret a signal from each of the neutron sensor 7 and the gamma sensor 6 (each of the neutron sensor 7 and the gamma sensor 6 being a scintillator and providing and optical output in response to a radiation interaction). Therefore, the use herein of a PMT as the photosensor 5 is merely illustrative and non-limiting.

One skilled in the art will recognize that the neutron sensor 7, using the ZnS/LiF component provides for detection of neutrons through an intermediate (n, α) interaction. That is, a thermal neutron interacting with Li-6 will cause an emission of an alpha particle. Interaction of the alpha particle with the ZnS provides for light emission from the ZnS scintillator. Accordingly, although other phenomena may be included or potentially influence signals generated by the ZnS/LiF component, it should be recognized that the use of "neutron sensor" accounts for the various aspects and mechanisms that provide for or are attendant with neutron detection, and therefore the term "neutron sensor" is not to be limited by the various aspects and mechanisms.

Further, various forms are known for the ZnS/LiF component. For example, the neutron sensor 7 may include a single layer mixture of the ZnS/LiF component or separate layers of ZnS and LiF. Accordingly, these various combinations as well as combinations involving similar materials are within the teachings herein.

As one example, it should be noted that the neutron sensor 7 is capable of detection of alpha particles. In fact, one should note that the check source for the neutron sensor 7 is actually an alpha emitter. Accordingly, in at least some instances, for purposes herein, alpha detection and neutron detection are similar if not synonymous. That is, as an example and with respect to the check source, demonstration of proper alpha detection can be relied upon for demonstration of proper neutron detection.

Typically, both of the alpha source 8 and the gamma source 9 are of a nominal activity and provide for verification of proper operation. In one embodiment, the strength of each of the radioactive sources is chosen such that alpha excitation dominates gamma excitation, making isotope identification difficult. One skilled in the art will recognize that the alpha source 8 and the gamma source 9 may be removed or hidden from the HHRIID 10 during operation to provide for measurement of only one type of component of the ambient radiation fields.

As indicated in FIG. 1, the photosensor 5, in this exemplary embodiment, includes a PMT about two inches in diameter. The gamma sensor 6 is about one inch in diameter. Of course, these dimensions are merely illustrative and are not limiting of the teachings herein.

The photosensor 5 is optically coupled to the gamma sensor 6 and the neutron sensor 7, and includes a coupling to detector electronics 2. In FIG. 1, the detector electronics 2 include an analog-to-digital converter (ADC) 11. The detector electronics 2 receive a signal S from the photosensor 5 and provides for analysis in accordance with the teachings herein. Each signal S is indicative of a radiation interaction in one of the gamma sensor 6 and the neutron sensor 7, and has a signal amplitude $V_O$.

Apparatus suited for practice of the teachings herein include HRIID 10 using (for the gamma sensor 6) a gamma-ray scintillator material (such as $LaBr_3$) that is relatively thick and has a high density and effective atomic number. The thickness may be judged, among other things, according to a mean free path for selected energy gamma rays. These properties provide for increased gamma sensitivity with inherent insensitivity to neutrons. That is, the gamma sensor 6 is typically fabricated of materials that are free, or substantially free, of hydrogen or other nuclides that react with neutrons. Upon excitation, the gamma sensor 6 (the gamma-ray scintillator) emits a pulse of light with a first signal decay time $\tau_1$ of about 25 nanoseconds.

The neutron sensor 7 (that is, "neutron sensing material") does not interact significantly with gamma rays because the neutron sensor 7 is thin and has a composition that is low in density and effective atomic number. Neutron detection is possible due to the presence of the isotope Lithium-6 (Li-6) that has a relatively large (940 barns) reaction cross-section for thermal neutrons and produces energetic charged particles (alphas and tritons) without gamma rays. The energetic alpha and triton particles are stopped within the ZnS/LiF scintillation layer and create a pulse of light with a second signal decay time $\tau_2$ of a few hundred nanoseconds.

Of course, one skilled in the art will realize that the various sensors described herein are scintillation detectors and have certain properties in common (i.e., the generation of some quanta of light in response to a radiation interaction). Accordingly, the photosensor 5 translates signals produced by the scintillation detectors and provides a common input to detector electronics 2.

In order to determine the source of scintillation light, one can look at the characteristics of the electrical signal response of the photosensor 5.

Figure 2:
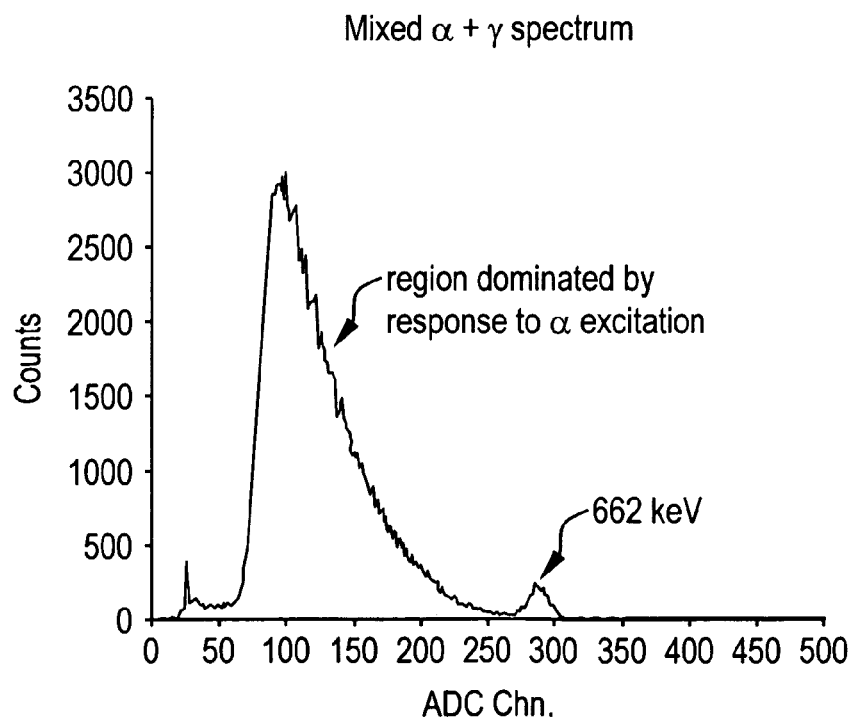
FIG. 2 depicts a spectral display of a mixed alpha radiation and gamma radiation field for the detector of FIG. 1.

FIG. 2 depicts aspects of the energy spectrum recorded by the HHRIID 10 of FIG. 1 for a mixed radiation field that included an alpha component and a gamma component.

Figure 3:
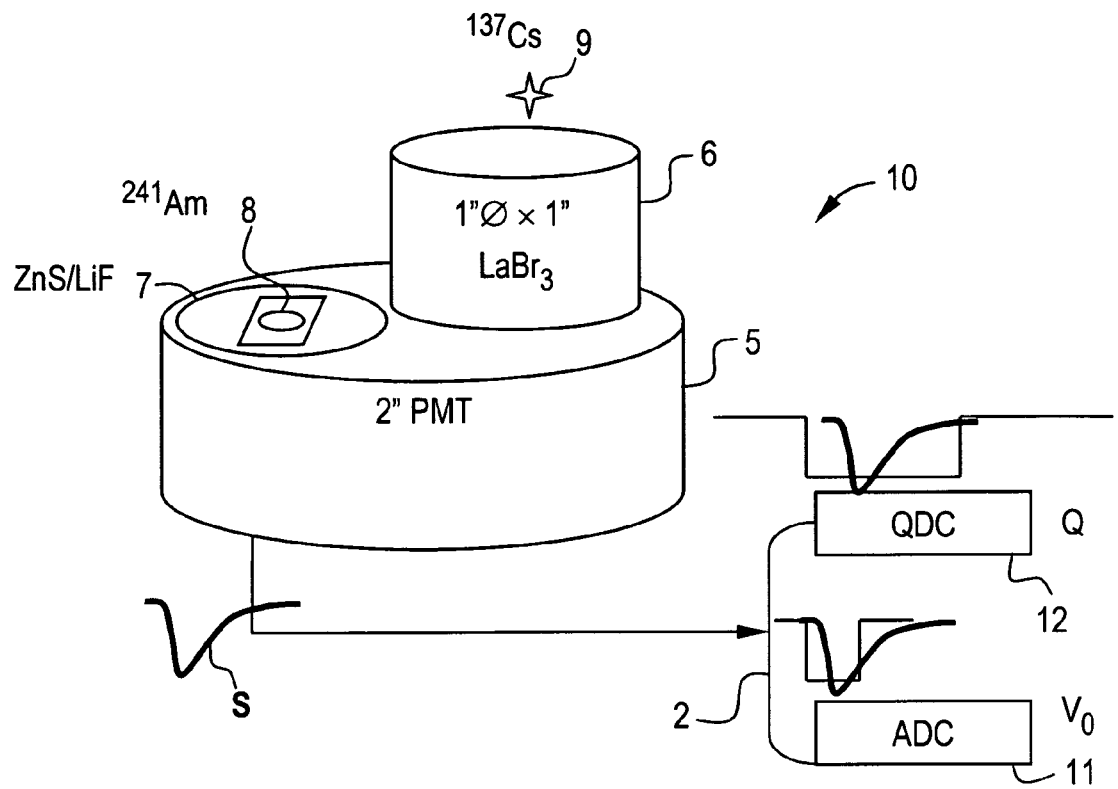
FIG. 3 depicts components of an embodiment of HHRIID capable of neutron-gamma pulse shape discrimination according to the teachings herein.

FIG. 3 depicts an embodiment of the mixed field HHRIID 10. The mixed field HHRIID 10 includes the photosensor 5, the gamma sensor 6 and the neutron sensor 7. The gamma sensor 6 is typically a scintillation detector that is selected for detection of gamma rays with high sensitivity and high energy resolution. The neutron sensor 7 is typically a neutron scintillator selected for detection of neutrons with high sensitivity. The gamma sensor 6 and neutron sensor 7 are optically separated so that light from one type of scintillator does not interact with the other scintillator and avoids absorption by or excitation of the other scintillator material. This provides certain advantages over prior art techniques, including improved signal analysis as well as simplified signal discrimination. In this embodiment, the detector electronics 2 include the ADC 11 and also a charge [Q] to digital converter (QDC) 12. The teaching herein provide for comparing the amplitude and the integrated charge of the electrical signals in photosensor 5 resulting from the excitation of the neutron sensor 7 and the gamma sensor 6.

Typically, each of the neutron sensor 7 and the gamma sensor 6 are selected for providing efficient operation. That is, in the prior art, where one scintillator may have been used, it was necessary for the one scintillator to have properties useful for detection of various types of radiation. As a result, and by way of example, the resolution of the one scintillator for gamma radiation was not as high as might be achieved when using a scintillator designed for detection of gamma radiation alone. Accordingly, by use of separate neutron sensors 7 and the gamma sensors 6, the HHRIID 10 provides improved signal analysis and data to users.

In order to provide for improved signal analysis and data, the HHRIID 10 typically includes separate optical couplings for each of the neutron sensor 7 and the gamma sensor 6 to the photosensor 5.

Accordingly, selection of each of the neutron sensor 7 and the gamma sensor 6 accounts for the various measures that may be taken to improve the detection capabilities and properties thereof. This selection may be considered as "tailoring" and "optimizing" of each of the each of the neutron sensor 7 and the gamma sensor 6.

Typically, integration time for the ADC comprises a period of time selected for peak detection of a sufficient quality, while integration time for the QDC comprises a period of time selected for charge integration of a sufficient quality. The "sufficient quality" is typically determined by personnel during calibration of the HHRIID 10.

Referring again to signal analysis, the amplitude and rise time of the signal S are not indicative of the source of light (neutron or gamma interaction) since both can have a comparable dynamic range. For these applications, reference may be had to ANSI 42.34. On the other hand, signal decay time $\tau$ is a quantity specific to each scintillator ($\tau_1$ about 25 ns for the gamma sensor 6 versus $\tau_2$ of approximately 200 ns for neutron sensor 7).

One skilled in the art will recognize that the interaction events with scintillation decay time $\tau_1$ will be separated from the interaction events with scintillation decay time $\tau_2$, if the ratio of $\tau_1/\tau_2$ is a sufficiently large number. In particular, for the materials used in the HHRIID design presented herein, if the ratio $\tau_1/\tau_2$ is approximately 8, then a good separation of decay times exists. However, in most cases, if the ratio $\tau_1/\tau_2$ is greater than one, adequate discrimination may be realized.

Direct measurement for the decay time of each electrical pulse requires digital sampling of the signal S with an analog-to-digital converter (ADC) at frequencies of at least several hundreds of MHz. A simpler solution is to measure the decay time for each signal S by integrating the exponential signal and dividing the result to the amplitude of the signal. This can be verified mathematically by integrating an exponential decay function:

$$\int_0^\infty V_o e^{(-t/\tau)} dt = V_o \cdot \tau \qquad (1)$$

where t represents time (here, measured in nanoseconds), $\tau$ represents the signal decay time, and $V_0$ represents a signal amplitude. In practice, the signal amplitude $V_0$ can be measured by a non-sampling peak-sensing analog-to-digital converter (ADC) 11, while the integral of Eq. (1) is proportional to the total integrated charge Q which can be measured by a charge-to-digital converter (QDC) 12.

The pulse discrimination method presented herein calls for analyzing each signal S from the photosensor 5 in two branches. A first branch leads to a peak-sensitive ADC 11. In some embodiments, the first branch may include a fast shaping amplifier followed by the peak-sensitive ADC 11. In the second branch, the identical signal S is used as an input to a QDC 12. Typically, QDC modules work in a gated mode with an additional "gate" electronic signal provided to the module to specify the time interval for charge integration. In one embodiment, since the QDC 12 must integrate the signal S over a period of time longer than the decay time, a "long gate" signal of approximately 800 ns is used. The peak-sensing ADC 11 uses a comparatively "short gate" interval of approximately 50 ns.

By measuring the amplitude of the pulse with the ADC 11 and the charge of the pulse with the QDC 12, the teachings herein have the advantage of being insensitive to "dark current" pulses from the photosensor 5 and provide an improved signal-noise ratio over prior art techniques. Thus, the peak amplitude of the pulses (from the ADC 11) is preserved and assures the high energy resolution of the scintillator remains unperturbed for improved isotope identification.

The method described for pulse shape discrimination in an integrated HHRIID-type neutron-gamma detector 10 requires determining two parameters for each radiation interaction: the signal (pulse) amplitude $V_0$ and the pulse charge Q. By forming the ratio of the two quantities $Q/V_0$, one can determine the scintillation decay time and associate each signal S as being one of a neutron interaction event and a gamma interaction event.

Referring to FIG. 3, the signal S from the photosensor 5 is split and sent to the QDC 12 and the ADC 11, for digital measurement of the signal charge Q and amplitude $V_0$, respectively.

Figure 4:
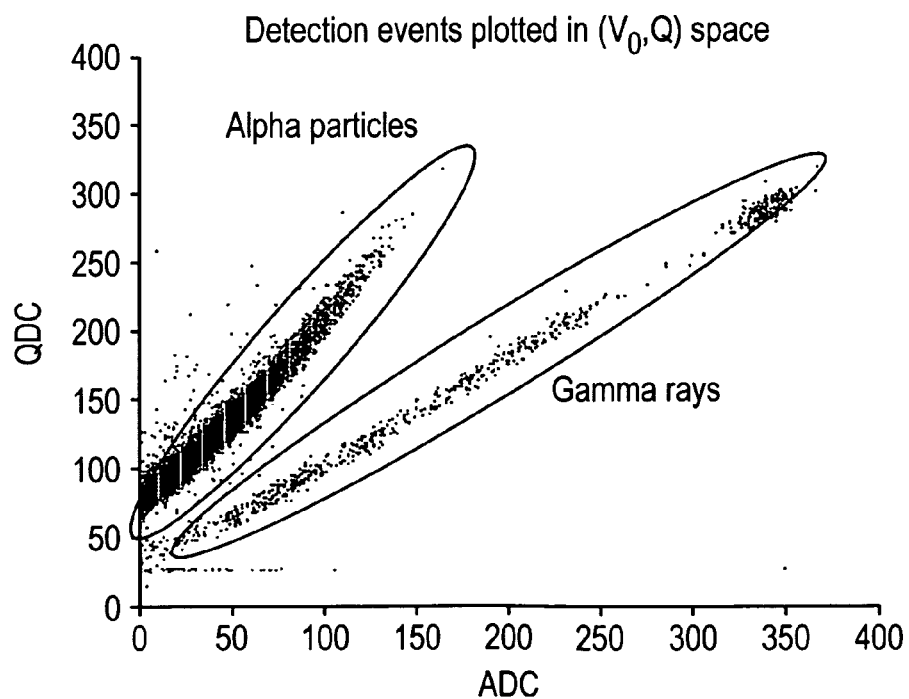
FIG. 4 depicts a two-dimensional spectral display of a mixed alpha radiation and gamma radiation field for the detector of FIG. 3.

FIG. 4 provides an exemplary scatter plot of radiation detection measurement data. In FIG. 4, the data are presented as points of coordinates ($V_0$, Q) in a two-dimensional space. Applying the teachings herein, which are reliant, among other things, upon different decay times for each of the sensing elements, the separation between alpha detection events and gamma detection events is clear.

Figure 5:
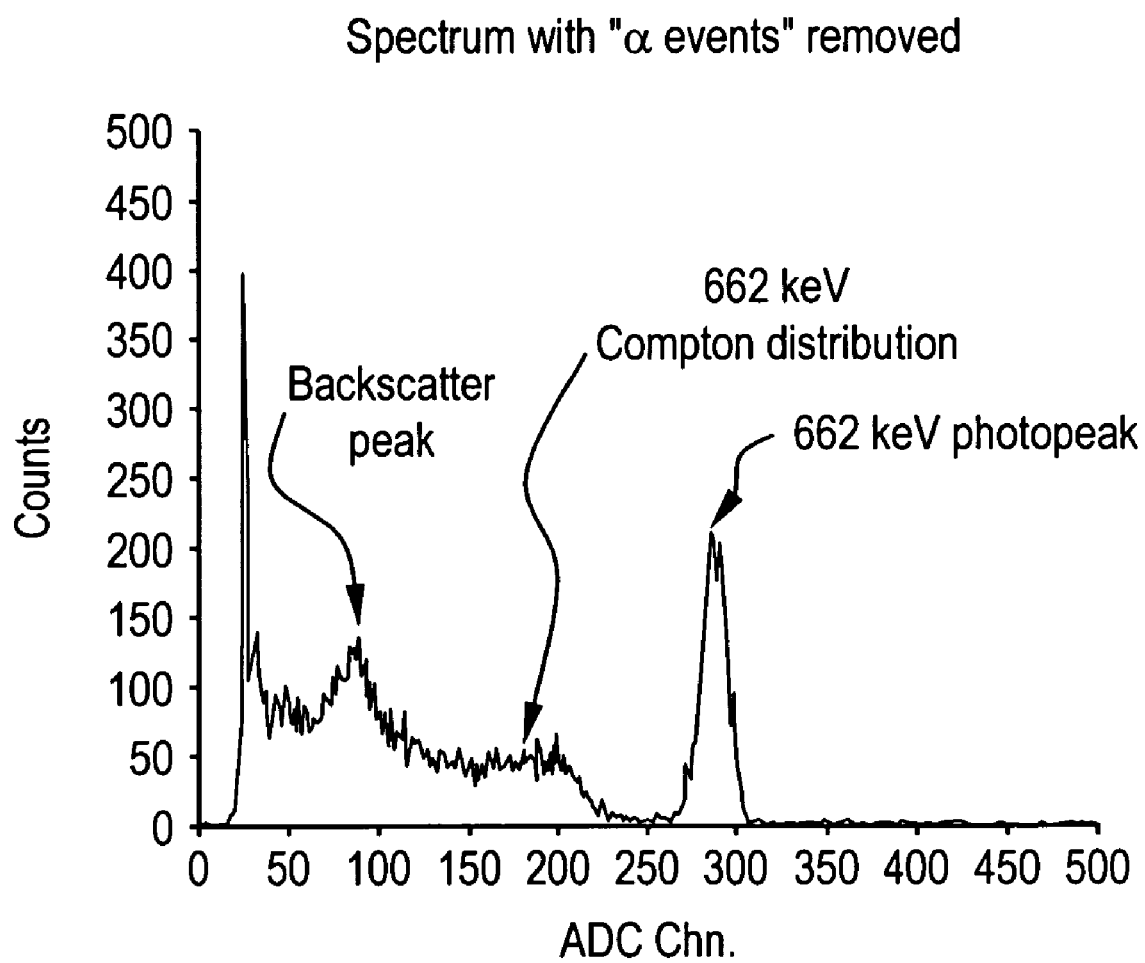
FIG. 5, in conjunction with FIG. 2, provides a comparison of spectra before and after neutron-gamma pulse shape discrimination.

FIGS. 2 and 5 collectively provide a comparison of spectra collected without discrimination (FIG. 2) and with discrimination (FIG. 5). Note that the spectra were collected using the check sources selected such that the alpha excitation dominated gamma excitation and made isotope identification difficult. In FIG. 2, the mixed alpha and gamma spectrum is shown. In FIG. 2, the alpha detection dominates the spectral data. In FIG. 5, a spectrum is shown where the alpha component has been removed. That is, the spectrum depicted in FIG. 5 was obtained after pulse shape discrimination and removal of the alpha detection events.

Referring to FIG. 5, the correct gamma energy spectrum is retrieved after the method is applied. That is, FIG. 5 depicts a typical gamma spectrum for the Cs-137 source alone.

An appropriately equipped HHRIID 10 may be used for identifying radioisotopes by their gamma emission without being perturbed by additional alpha (or neutron) radiation. Stated another way, the HHRIID 10 includes at least one gamma sensor 6 having a first signal decay time $\tau_1$ and a neutron sensor 7 having a second signal decay time $\tau_2$, wherein the first signal decay time $\tau_1$ and the second signal decay time $\tau_2$ are substantially separate from and distinguishable from each other. By using the separation, the teachings herein provide for separating signals from the gamma sensor 6 and signals from the neutron sensor 7. The separation of the signals provides for detection of neutron (or alpha) components in a mixed radiation field that includes gamma radiation. The separation of the signals further provides for improved nuclide identification for gamma emitting radionuclides.

The teachings herein can be implemented for an HHRIID 10 having a single photosensor coupled to two scintillator materials that provide excitation emissions having different decay times. In particular, this method provides for improved spectroscopy results using Hand-Held RadioIsotope Identification Devices (HHRIID) which are sensitive to both gamma rays and neutrons where the spectroscopy is performed in mixed radiation fields.

Figure 6:
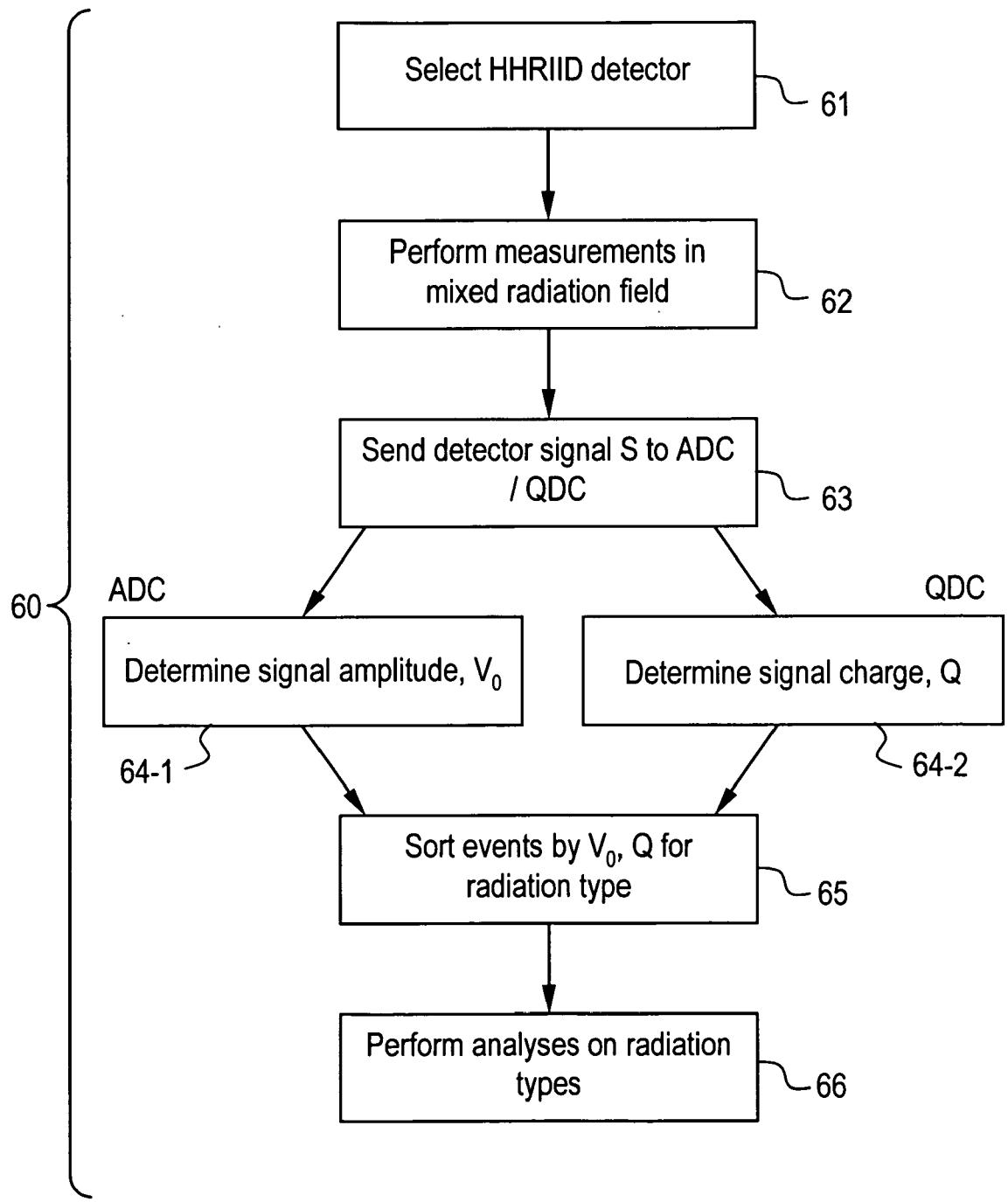
FIG. 6 depicts an exemplary method for analyzing mixed field data.

FIG. 6 depicts aspects of an exemplary method for radiation detection in a mixed field, wherein the method is based upon the teachings herein. In FIG. 6, field discrimination 60 calls for selecting a HHRIID instrument, such as HHRIID 10, at Step 61. At Step 62, performing measurements calls for immersing the HHRIID 10 in a mixed radiation field to detect radiation interactions. Once the HHRIID 10 commences collecting signals S associated with each radiation interaction, sending the signal occurs at Step 63. Sending the signal 63 calls for distributing the signal between the ADC 11 and the QDC 12. Determining signal amplitude $V_0$ at Step 64-1 and determining signal charge Q at Step 64-2 is performed. The signal amplitude $V_0$ and the signal charge Q for each event is used for sorting events at Step 65. Sorting events 65 provides for classification of each event as one of neutron (or equivalently alpha for the embodiment described herein) and gamma. Performing analyses at Step 66 is then completed, and typically involves using prior art techniques for analysis of gamma ray spectra. Performing analyses 66 may include assessments regarding the neutron component (for example, conversion of neutron flux to a dose equivalent).

The HHRIID 10 typically includes other components as are known in the art. For example, the HHRIID 10 may include software, at least one processor, memory, bus, display, ports and other devices. Radionuclide libraries including, for example, aspects such as half-life, energy, yield and radionuclide identity may be included and referenced during processing. Software may include peak searching algorithms and other analysis tools. As these devices are generally known and provide for enhanced operation, such components have not been discussed further herein.

The benefit for HHRIID applications is that the neutron events can be separated in real-time from gamma events. The neutron events can be counted and provide the neutron count rate information, while the gamma events can be displayed in a histogram as a faithful representation of the detected gamma energy spectrum. Since pulse shape discrimination rejects unwanted neutron events from the gamma energy spectrum, the task of identifying isotopes by their gamma emission lines can be achieved with high sensitivity and independent of the intensity of the neutron flux at the detector. The method above can be applied in general to any dual radiation detector which is based on multiple scintillator materials having different signal decay times $\tau_x$ for each of the scintillators.

The method was tested and demonstrated using an HHRIID detector design consisting of the following main components: one photomultiplier tube (PMT) as the photosensor 5; one ZnS/LiF:Ag thin layer (zinc sulfide and lithium fluoride doped with silver), as the neutron sensor 7; one $LaBr_3$ (or one LYSO scintillator crystal), as the gamma sensor 6; detector electronics 2 that included modular NIM and CAMAC electronics for pulse processing and including an ADC 11, a QDC 12, a fast filter amplifier, a constant fraction discriminator (CFD), and two gate generator modules.

In the test model, the photosensor 5 was coupled to both the neutron sensor 7 and the gamma sensor 6 using optical grease. Because a neutron source was not available, a Am-241 alpha particle source was used to excite the neutron sensor 7 (as stated above, it is recognized that the light response to neutron excitation is similar to direct alpha excitation because alpha particles are generated by neutron capture in Li-6 of the LiF). A radioactive Cs-137 source (having a 662 keV gamma photon emission) was used to excite the gamma sensor 6.

In order to evaluate the concept of the pulse shape discrimination method, measurements were taken as follows. First, the gamma source 9 was used to excite the HHRIID 10. This exposure was in the absence of any (neutron-equivalent) alpha excitation. The gamma energy spectrum was recorded by displaying the output of the ADC 11 as a histogram. Next, the alpha source 8 was added to create a simultaneous alpha and gamma excitation (as a surrogate for the neutron and gamma excitation). Again, the output of the ADC 11 was displayed as a histogram. The output for the alpha and gamma excitation showed that the spectrum was comparatively distorted as in FIG. 2, due to the addition of the alpha source 8. According to the teachings herein, a discrimination algorithm was applied to the data from the ADC 11 and data from the QDC 12 to classify each event as one of a gamma interaction and an alpha interaction (or equivalently, a neutron interaction or a neutron excitation). The alpha interaction events were then eliminated from the ADC histogram. This provided a gamma energy spectrum (as shown in FIG. 5) that was free of data associated with alpha interaction events and was identical to the spectrum recorded for gamma excitation only.

FIG. 7 depicts measurement data collected in the mixed field of radiation, simulated by the use of the check sources. The mixed field includes the alpha component (as a surrogate for the neutron component) and the gamma component. The graph shows aspects of the advantages of pulse discrimination. That is, the original gamma spectrum is depicted, as well as the gamma spectrum wherein the alpha counts have been stripped out (thus displaying the gamma component alone). It can be seen that the gamma only spectrum provides more information useful for peak search algorithms. It should be noted that although the number of radiation interactions (i.e., counts) are plotted against the ADC channels, that this is equivalent to plotting counts versus energy (as each ADC channel represents a certain energy range).

Although disclosed herein as being formed of an $LaBr_3$ crystal, the gamma sensor 6 and the neutron sensor 7 may include any of a variety of scintillation materials. Typical materials for the gamma sensor 6 include, without limitation, crystalline materials with high energy resolution (3% or better at 662 keV) from the Lanthanum halides class ($LaBr_3$, $LaCl_3$, $LaI_3$), as well as solid solutions of these materials. Other dense, bright and fast scintillator materials are useful for incorporation into the gamma sensor 6 as well. In addition to use of ZnS/LiF and ZnS/LiF:Ag for the neutron sensor 7, other mixtures of Li-based powder material and scintillator particles in a matrix may be selected.

In some embodiments of the HHRIID 10, machine-readable instructions are stored on machine-readable media within the HHRIID 10, and provide for implementation of pulse discrimination. In other embodiments, the instructions are maintained separately and implemented through a remote connection. Exemplary machine-readable media include, without limitation, hard wired circuits, read-only memory, random access memory, a hard drive, an erasable programmable read-only memory, magnetic tape, optical media, magneto-optical media and others.

Other exemplary embodiments of the teachings herein include use of a plurality of the HHRIID, or equivalents thereof, in permanent installations for radiation monitoring and radiation surveillance. Non-limiting examples include fixed monitoring for package or vehicle inspection. The plurality of monitoring devices provides for increased sensitivity accuracy and throughput in a production environment. Accordingly, a variety of systems may be realized wherein an RIID (an embodiment of the HHRIID that is not necessarily hand-held) are used. Typically, in such embodiments, the RIID are coupled to a central console for evaluation and summation of data from each element within the plurality. As such techniques for radiation monitoring are known, such aspects are generally not discussed further herein.

Accordingly, the teachings herein provide the technical effect of separating alpha radiation fields and neutron radiation fields from gamma radiation fields. Of course, one skilled in the art will recognize that other embodiments may be realized. For example, accounting for beta radiation fields using appropriate scintillators may be realized. Other radiation types that may be evaluated include, without limitation, alpha particles, beta particles, gamma rays, ions and neutrons. The apparatus need not be limited to "hand held" implementations, and may include other physical constructions, such as, for example, permanent installations. Accordingly, the teachings herein are not limited to the exemplary embodiments provided.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for discriminating between radiation types of a mixed radiation field, the method comprising:
   selecting a radioisotope identification device (RIID) comprising a photosensor optically coupled to a first sensor and a second sensor, the photosensor also coupled to electronics comprising an analog-to-digital converter (ADC) and a charge-to-digital converter (QDC);
   using the first sensor and the second sensor for detecting interactions of radiation incident on the RIID in the mixed radiation field;
   using the ADC for determining a signal amplitude $V_0$ for each detected interaction and using the QDC for determining an integrated signal charge Q for each detected interaction; and
   classifying each radiation interaction according to radiation type by evaluating the signal amplitude $V_0$ and the integrated signal charge Q.

2. The method as in claim 1, wherein the radiation type comprises at least one of alpha particles, beta particles, gamma rays, ions and neutrons.

3. The method as in claim 1, further comprising analyzing each classification of radiation for at least one of an energy, a radionuclide identity and a dose equivalent.

4. The method as in claim 1, further comprising displaying at least one classification in a histogram format where each radiation interaction is plotted according to energy.

5. The method as in claim 1, wherein evaluating the signal amplitude $V_0$ and the integrated signal charge Q comprises forming a ratio ($Q/V_0$).

6. The method as in claim 5, wherein the ratio provides for determining a scintillation decay time for each of the sensors.

7. The method as in claim 6, wherein a scintillation decay time for the first sensor is separated from the scintillation decay time for the second sensor by a factor greater than one.

8. The method as in claim 1, wherein classifying radiation interactions further comprises discarding radiation interactions for at least one type of radiation.

9. The method as in claim 1, wherein an integration time for at least one of the QDC and the ADC is selected for controlling pulse shape discrimination to account for a scintillation decay time associated with each type of radiation.

10. The method as in claim 9, wherein an integration time for the ADC is about 50 nanoseconds.

11. The method as in claim 9, wherein an integration time for the ADC comprises a period of time selected for peak detection of a sufficient quality.

12. The method as in claim 9, wherein an integration time for the QDC is about 800 nanoseconds.

13. The method as in claim 9, wherein an integration time for the QDC comprises a period of time selected for peak detection of a sufficient quality.

14. A radioisotope identification device (RIID) for discriminating between radiation types in a mixed radiation field, the RIID comprising:
  a photosensor optically coupled to at least a first sensor and a second sensor, the photosensor also coupled to electronics comprising an analog-to-digital converter (ADC) and a charge-to-digital converter (QDC), wherein the ADC provides for determining a signal amplitude $V_0$ associated with detected radiation interactions and the QDC provides for determining an integrated signal charge Q associated with each detected radiation interaction; and
  machine-readable instructions stored on machine-readable media for classifying each radiation interaction according to radiation type by evaluating the signal amplitude $V_0$ and integrated the signal charge Q.

15. The radioisotope identification device (RIID) as in claim 14, wherein the device is one of hand-held device and a permanent device.

16. The radioisotope identification device (RIID) as in claim 14, wherein the first sensor comprises a gamma sensor and the second sensor comprises a neutron sensor.

17. The radioisotope identification device (RIID) as in claim 16, wherein the gamma sensor comprises a sensor formed of materials comprising: a crystalline form of at least one of $LaBr_3$, $LaCl_3$, $LaI_3$; a solid solution of at least one of $LaBr_3$, $LaCl_3$, $LaI_3$; and a form of a dense, bright and fast scintillator material.

18. The radioisotope identification device (RIID) as in claim 16, wherein the neutron sensor comprises a sensor formed of at least one of: ZnS/LiF, ZnS/LiF:Ag and a mixture of a Lithium based powder material comprising scintillator particles.

19. The radioisotope identification device (RIID) as in claim 14, wherein the machine readable media comprise at least one of hard wired circuits, read-only memory, random access memory, a hard drive, an erasable programmable read-only memory, magnetic tape, optical media and magneto-optical media.

20. The radioisotope identification device (RIID) as in claim 14, wherein the photosensor comprises at least one of a photomultiplier tube, a photodiode and an avalanche photodiode.

21. A system for radiation monitoring, comprising:
  a plurality of radioisotope identification devices (RIID) assembled in a geometry for
  for discriminating between radiation types in a mixed radiation field, the RIID comprising:
  a photosensor optically coupled to at least a first sensor and a second sensor, the photosensor also coupled to electronics comprising an analog-to-digital converter (ADC) and a charge-to-digital converter (QDC), wherein the ADC provides for determining a signal amplitude $V_0$ associated with detected radiation interactions and the QDC provides for determining an integrated signal charge Q associated with each detected radiation interaction; and
  machine-readable instructions stored on machine-readable media for classifying each radiation interaction according to radiation type by evaluating the signal amplitude $V_0$ and the integrated signal charge Q.

* * * * *

UNITED STATES PATENT AND TRADEMARK OFFICE
CERTIFICATE OF CORRECTION

PATENT NO.       : 7,388,206 B2
APPLICATION NO.  : 11/424559
DATED            : June 17, 2008
INVENTOR(S)      : Adrian Ivan Page 1 of 1

It is certified that error appears in the above-identified patent and that said Letters Patent is hereby corrected as shown below:

STATEMENT OF FEDERALLY FUNDED RESEARCH, column 1, remove text from lines 8-12 and replace with --This invention was made with Government support under grant number N66001-05-D6012, task #1, awarded by the Homeland Security Advanced Research Projects Agency, and The Space and Naval Warfare Systems Center, San Diego. The Government has certain rights in the invention.--.

Signed and Sealed this

Twelfth Day of August, 2008

JON W. DUDAS
*Director of the United States Patent and Trademark Office*